May 12, 1959     G. E. BJÖRKLUND     2,886,354
FASTENERS
Filed Jan. 29, 1951
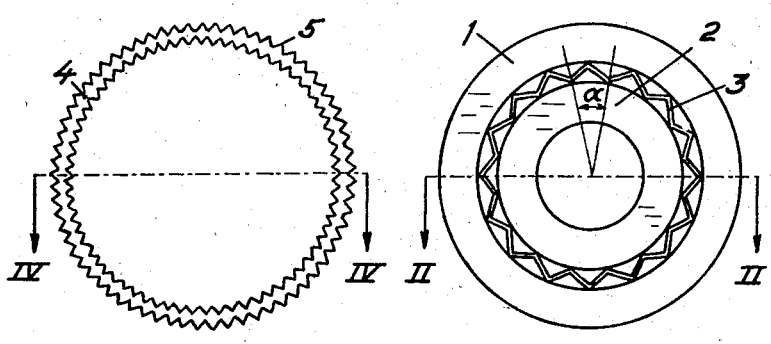
FIG. 3     FIG. 1
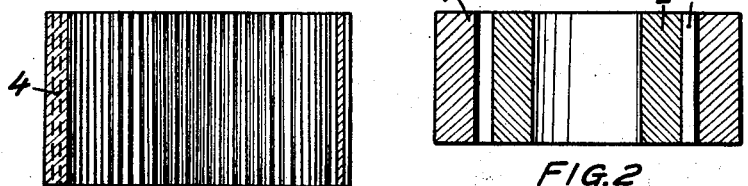
FIG. 4     FIG. 2
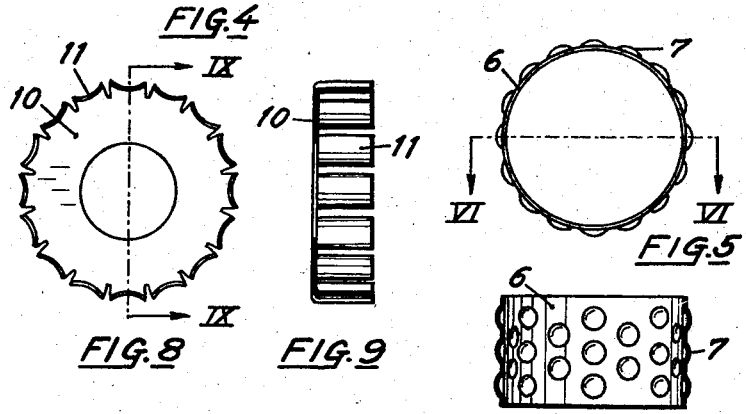
FIG. 8     FIG. 9     FIG. 5
FIG. 6
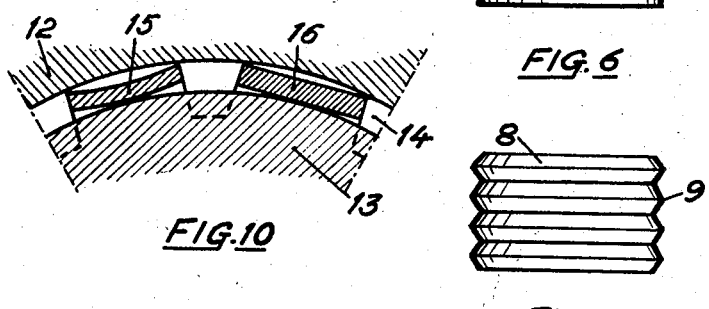
FIG. 10     FIG. 7

United States Patent Office 2,886,354
Patented May 12, 1959

2,886,354

FASTENERS

Gustaf Erik Björklund, Stockholm, Sweden

Application January 29, 1951, Serial No. 208,300

1 Claim. (Cl. 287—52)

If two parts are to be secured together by one part being inserted in a hole in the other part and held in position in the latter part by means of friction, very close tolerances of the hole and the part inserted therein are often necessary in order that too great differences in the pressure effecting the friction will not occur. For instance, this is the case in mounting ball bearings, too great as well as too small engaging pressure jeopardizing the right function of the ball bearing. As working to dimensions having small tolerances requires expensive and time-consuming working operations, it would be advantageous if the value of the tolerance (according to the I.S.A.-tolerance system in which a higher value corresponds to less accuracy, i.e. larger tolerance zone for the same nominal size) could be raised, without the differences in pressure being increased correspondingly. This is made possible by using a fastener according to the present invention which is adapted to be inserted in the annular space between an outer member, inwardly cylindrical, and an inner member, outwardly cylindrical, for securing said members together.

One object of the invention is to provide a fastener of this kind so arranged and constructed as to be deformed plastically when inserted in the annular space.

Another object of the invention is to provide a fastener having cavities into which the material can flow or expand during the plastic deformation.

Another object of the invention is to provide a fastener so constructed and arranged as to be deformed in such a way, when inserted in the annular space, that the radial pressure on the fastener will be independent of the size of the clearance between the members to be connected.

Another object of the invention is to provide a fastener comprising elements intended to be inserted in the annular space and another element that is not intended to extend into said space but to hold the former elements together.

Still further objects of the invention will be apparent from the following description taken in conjunction with the accompanying drawing which illustrates several embodiments of the invention. In the drawing, Fig. 1 is an end view of a fastener according to the invention used for connecting two rings, Fig. 2 shows a longitudinal section of the fastener and the rings taken on the line II—II of Fig. 1, Fig. 3 is an end view of another embodiment of the invention, Fig. 4 shows a longitudinal section taken on the line IV—IV of Fig. 3, Fig. 5 is an end view of a further embodiment of the invention, Fig. 6 shows a longitudinal section taken on the line VI—VI of Fig. 5, Fig. 7 shows an axial section of a further embodiment of the invention, Fig. 8 is an end view of a further embodiment of the invention, Fig. 9 shows a longitudinal section taken on the line IX—IX of Fig. 8 and, finally, Fig. 10 shows on an enlarged scale in part a portion of the fastener according to Figs. 8 and 9 arranged in the space between two elements and in part a somewhat modified embodiment of such a portion in the same space.

In Figs. 1 and 2, 1 indicates an outer ring in which an inner ring 2 is secured by means of a fastener in the form of a corrugated ring 3, the folds of which extend axially. The ring 3 is dimensioned in such a way, that the desired radial pressure is obtained on the outer envelope surface of the inner ring and on the inner envelope surface of the outer ring. The radial pressure acting on the corners of the folds is divided into components in parallel direction to the ring material on both sides of each corner. The material of the ring between an outer corner and the adjacent inner corner is upset in the direction of these components. It is now assumed, that the outer diameter of the inner ring is constant, while the inner diameter of the outer ring can be varied within the limits determined by the tolerance within which the hole of the ring is formed. As an outer ring, being of the high limit of the tolerance zone, is slid onto the corrugated ring arranged on the inner ring, a certain radial pressure and a corresponding component force compressing the material is obtained. Supposing, that an outer ring, being of the low limit of the tolerance zone, is instead pressed upon the corrugated ring, the reduced radial clearance will involve increased deformation of the corrugated ring and a larger compression of the material of each fold. At the same time, however, there is a flattening out of the folds, their corner angles being enlarged. By choosing suitable material for and dimensions of the corrugated ring, it is possible for the increased stress in the material, corresponding to the increased compression, to be wholly compensated by the increase of the component force caused by the change of angles at unaltered radial pressure.

It is thus obvious, that the hole dimensions of the outer ring may be varied considerably without the radial pressure being altered to a degree worth mentioning which means, that a high value of tolerance can be chosen. The diameter of the inner ring may be varied correspondingly within wide limits at approximately constant value of the diameter of the outer ring. Further, the dimensions of both rings may vary within moderate limits, without the radial pressure being altered to a degree worth mentioning.

The material of the corrugated ring as well as its pitch angle α, material thickness and height of folds are chosen in each individual case with regard to the dimensions and tolerances of the outer and inner ring in order to arrive at the desired radial pressure. This is a matter of dimensioning only which is obvious to those skilled in the art.

The ring 4, shown in Figs. 3 and 4, is provided with grooves extending axially on the outer and inner sides, so that projecting teeth or ridges 5 are formed. As the ring is pressed into the annular space between two parts to be connected, the teeth will be deformed plastically, and therefore, less variation of the radial pressure will occur with variations in the size of the space between the parts than is the case with direct fitting of the parts with the same tolerances. However, by making the grooves oblique in relation to the radius, so that the teeth or ridges will be inclined, it is also possible in this construction to obtain such an effect, that the radial pressure will remain approximately constant with varying radial clearance between the parts. However, a necessary condition for this is, that the height and width of the teeth are chosen in such a way, that their angle of inclination is altered through plastic deformation, as the ring is driven home.

In Figs. 5 and 6 a ring of relatively thin material is shown which is provided with bulbous projections 7 which are deformed plastically, as the ring is pressed into the space between two parts to be connected. The ring 8, shown in Fig. 7, is provided with corrugations running parallel to the edges, said corrugations making the ring's compression possible in radial direction. To a certain extent, the same effect is obtained in both of these latter forms of fasteners as in the fasteners according to Figs. 1 and 2, the projections and corrugations respectively being deformed in about the same manner as the folds of the ring 3.

In the embodiment of the invention, shown in Figs. 8 and 9, the ring shaped fastener is divided in a number of sections through axial cuttings, the sections being held together by an element which is not intended to be inserted into the space between the parts to be connected. The fastener is thus made out of a substantially circular plate 10 which is cut at the edge, so that lugs 11 are formed which are bent in the same direction and form right angles with the remaining plane portion of the plate. Moreover, the lugs which are thus positioned in a substantially circular ring are curved, the concave sides facing outwardly. When this fastener is used, the lugs 11 are pressed into the space 14 between the parts 12 and 13 to be connected, as is seen in Fig. 10, which shows only an edge portion of the plate and the corresponding portions of the parts 12 and 13. Instead of being curved, such as the lug 15 shown in Fig. 10, the lugs may be flat such as the lug 16 shown in the same figure. However, the extent of curving, wall thickness, width and mutual distance of the lugs are chosen with regard to the size of the space 14 in order to obtain the desired radial pressure.

It is of essential significance that the material of the fastener as well as its dimensions are chosen in such a way that plastic deformation will occur from the desired radial pressure. By this means the stress in the material will be less dependent upon the extent of the deformation, and the radial pressure will vary less because of dimensional variations of the connected parts than in the case of elastic deformation only.

According to this invention it will be possible to use inexpensive working methods for holes and axles, by way of example, which will fit together, as well as in cases where the radial pressure in friction connections is not permitted to vary considerably. Thus, ball bearings may be mounted in holes made by turning, drilling or press casting or on axles machined to equivalent accuracy. On the other hand, it will be possible at moderate variations of the dimensions of holes and axles to obtain increased guarantee that the radial pressure will not exceed the values permitted. Moreover, inaccuracies in shape (ovalities) or of the surfaces of the holes and axles will be compensated. In practical application of the invention the fasteners may be standardized and provided with stamped data on sizes and grades to fit.

It will be understood that the invention forming the subject matter of this application is not restricted to the embodiments herein disclosed and hereinbefore described, but is intended to include all forms of structure falling within the scope of the appended claim.

What I claim is:

The combination with an outer member having an inner fixed cylindrical surface and an inner member having an outer fixed cylindrical surface of smaller diameter to provide an annular space between said members of a fastener to secure said members together, said fastener comprising an integral and circumferentially continuous one-piece ring-shaped element of deformable sheet material having less wall thickness than the distance between said surfaces and disposed in said annular space, said element including a plurality of radial force transmitting portions in contact with said inner and outer surfaces at a plurality of spaced locations substantially uniformly distributed around the circumferences of said surfaces and circumferentially offset from each other at the locations of contact with the respectively different surfaces, the diameters of the inscribed and circumscribed circles of said force transmitting portions prior to assembly of said element with said outer and inner members being respectively less than the diameter of said outer fixed cylindrical surface of said inner member and greater than the diameter of said inner fixed cylindrical surface of said outer member whereby said force transmitting portions become radially compressed to an extent effecting plastic deformation of the material of said element to provide a substantially constant radial pressure between said members independent of differences in the distance between said surfaces resulting from differences in the diameters of said surfaces within the tolerance limits for the manufacture thereof.

References Cited in the file of this patent

UNITED STATES PATENTS

| | | |
|---|---|---|
| 404,300 | Perkins | May 28, 1889 |
| 404,824 | Clark et al. | June 11, 1889 |
| 679,338 | Rohrbeck | July 30, 1901 |
| 784,524 | Latulip | Mar. 7, 1905 |
| 989,112 | Bradford | Apr. 11, 1911 |
| 1,156,582 | Biggar | Oct. 12, 1915 |
| 1,389,477 | Beeman | Aug. 30, 1921 |
| 1,424,211 | Pugh | Aug. 1, 1922 |
| 2,039,342 | Pielstick | May 5, 1936 |
| 2,084,777 | Poggensee | June 22, 1937 |
| 2,378,099 | Piron | June 12, 1945 |
| 2,496,700 | Cole | Feb. 7, 1950 |
| 2,504,776 | Woodfield et al. | Apr. 18, 1950 |
| 2,506,404 | Woodfield et al. | May 2, 1950 |
| 2,616,733 | Strange | Nov. 4, 1952 |

FOREIGN PATENTS

| | | |
|---|---|---|
| 309,081 | Germany | Nov. 14, 1918 |
| 484,148 | Germany | Oct. 11, 1929 |